Nov. 23, 1971  R. E. SHERWOOD  3,621,524
APPARATUS FOR THE CONTINUOUS PRODUCTION
OF SHEET FROM FLOWABLE MATERIAL
Filed Jan. 17, 1969
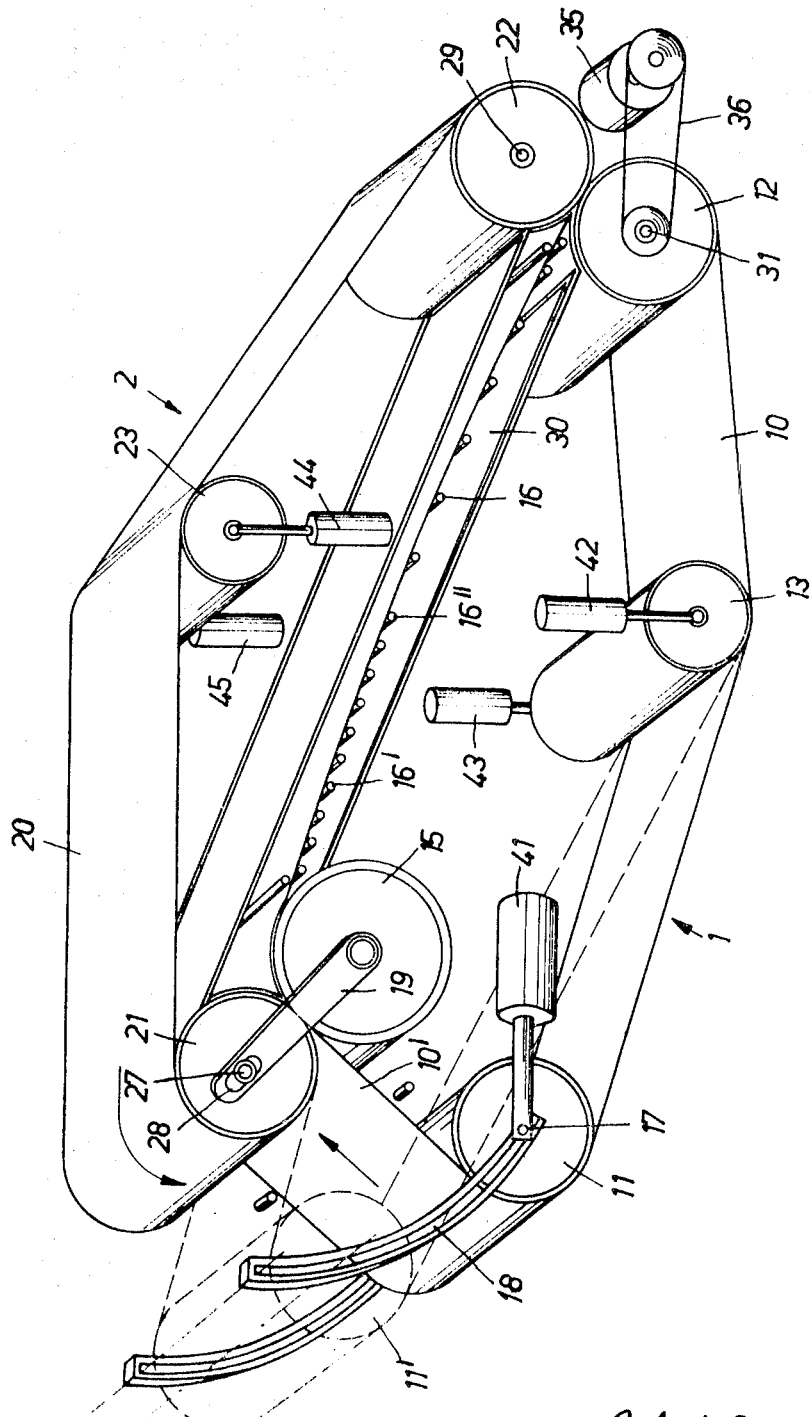
Inventor
Robert E. Sherwood
By C. E. Parker
Attorney United States Patent Office 3,621,524
Patented Nov. 23, 1971

3,621,524
APPARATUS FOR THE CONTINUOUS PRODUCTION OF SHEET FROM FLOWABLE MATERIAL
Robert E. Sherwood, Westport, Conn., assignor to
W. R. Grace & Co., Cambridge, Mass.
Filed Jan. 17, 1969, Ser. No. 792,075
Claims priority, application Germany, Jan. 20, 1968,
P 17 04 696.6
Int. Cl. B29c *15/00;* B29d *7/14*
U.S. Cl. 18—4 B                8 Claims

ABSTRACT OF THE DISCLOSURE

Apparatus for production of sheet material in which flowable, preferably thermosetting, material is formed into a sheet between adjacent runs of a pair of synchronously movable endless belts each passing over and being tensioned by at least two rollers. Preferably the upper run of the lower belt is outwardly bowed to reduce the possibility of ripples occurring in the belts while they are shaping the flowable material into sheet.

---

This invention relates to a machine for continuous production of sheets of predetermined uniform thickness from flowable materials. In its preferred form the machine is especially designed for processing solidifying materials such as thermosetting synthetic resins which cannot be shaped by rolling or other known techniques.

Calender rolls and similar devices are excluded from the beginning for this purpose, since feeding and uniform distribution of the fluid material is very difficult and the time the fluid material remains between the rotating rolls is not sufficient to solidify the material. Other devices are known which consist of a drum and an endless belt pressed against the surface of the drum and accompanying the rotating drum over the major part of its circumference. However, at a running speed sufficient for industrial purposes, i.e. at a sufficient production rate, the residence time in such a device is relatively short and in most cases, e.g. to solidify a thermosetting resin, not sufficient. Moreover, due to the relatively small area of the opposed drum and belt surface zones, very high pressures are developed between them; this, however, is of particular disadvantage, especially if a material with cellular or porous structure has to be produced. It is an object of the present invention to develop a device for continuous production of sheets which comprises two superposed rotating belts to overcome said difficulties. With sufficient length of the belts employed, the residence time of the feed material between the shaping surfaces is sufficient even at high running speed of the machine.

According to the invention there is provided apparatus for the continuous production of sheets of substantially uniform thickness from flowable material, such apparatus comprising two endless superposed synchronously movable belts each passing over and being tensioned by at least two rollers and adapted to shape the flowable material into a sheet between adjacent superposed runs of the two belts. Preferably one of the belts is driven and the other is operatively carried along with the driven one during operation of the apparatus. In a preferred embodiment, the non-driven belt is mounted for limited movement in axial direction of the rollers corresponding to lateral movements of the driven belts. While the apparatus can be constructed in such a way that both belts are driven at exactly the same speed, it has been found that detrimental relative motion between the belts can be eliminated in a simple manner when only one of both belts is driven and the other is freely running along with the driven belt due to friction or adhesion to the material between the belts. In order that the non-driven belt may follow a possible lateral shifting of the driven belt, the former is itself preferably capable of limited lateral movement.

One difficulty of such a device is to maintain an exact distance between the belts to warrant an exact dimensioning of the product thickness over the entire width and length of the sheet. Moreover, a movement of the belts relative to each other in the running direction as well as in transverse direction must be eliminated since otherwise there is the danger that the semisolid product is destroyed. Steel belts, which are preferred because of their long life, have the tendency to buckle even at small temperature variations so that a product of varying thickness is obtained. The preferred apparatus, as later described in detail, includes means for reducing these problems.

The invention will be further described, merely by way of example, in conjunction with the accompanying drawing which is a perspective view of a preferred embodiment. The frame supporting the whole device has been omitted in the drawing for the sake of clearness.

The machine consists of a lower part denoted generally with the reference number 1 and the associated upper part 2. The lower belt 10 runs in the direction indicated by the arrow over the two tension rollers 11 and 12. In the embodiment shown, the upper run of the lower belt 10 moreover passes in an upwardly or outwardly directed curve over a further rotatable guide roller 15 positioned at the feed end of the machine and in the direction of motion behind the first tension roller 11 of the lower belt 10. Suitably the additional guide roller 15 of the lower belt 10 is slidably mounted, most suitably for motion in vertical direction, in order to allow a variation of the degree of curvature of the upper run of the lower belt 10. Moreover, this roller 15 is positioned adjacent to the first tension roller 21 of the upper belt 20 in such a way that these two rollers form a slot between the belts 10 and 20 having a width dependent on the distance apart of the rollers which serve to distribute the feed material uniformly on the belt 10. The width of this slot substantially determines the thickness of the produced sheet and the amount of liquid material added is preferably sufficient to achieve a distribution of the material over the entire width of the belts.

The lower belt 10 is preferably longer than the upper belt 20 so that it projects at the feed end of the machine (in the drawing on the left side) beneath the upper belt; the feed material is added to this projecting portion 10' of the belt 10 from a suitable proportioning and feed device (not illustrated). In order to distribute the material at the slot between the upper tension roller 21 of the upper belt 20 and the roller 15 of the lower belt 10 over the entire width of the belt, the portion 10' of the belt 10 is inclined, the degree of inclination being variable by adjustment of the tension roller 11. For this purpose, the axis 17 of the roller 11 is journelled in two arcuate guide slots 18. The swinging motion can be accomplished by hydraulic cylinders 41. The degree of inclination of the belt portion 10' depends, inter alia, on the running speed of the belt 10, the viscosity of the feed material and in certain cases on the temperature of the belt. In general, the lower the viscosity and the lower the speed of the belt, the lower is the degree of inclination in order to avoid too strong a back-flow of the material in the direction opposite to the motion of the belt. The drawing shows the machine in a position where the roller 11 is almost at the lowermost point which simultaneously results in the maximum inclination of the belt portion 10'. Such a steep incline is only used with a relatively viscous material or with very high running speed of the belt. A second position 11' of the roller 11 is shown in the drawing in broken lines. In this position, the portion of the upper run of the belt 10 projecting beneath the upper belt 20 is practically no more inclined; in this position even very slightly viscous materials can be processed at relatively slow speed of the belts without a back-flow of the material in the direction opposite the motion of the belts occurring.

It is desirable to pass the upper run of the lower belt 10 in an outwardly bowed curve over further rotatably mounted guide roller 16, 16', 16''. This permits a uniform distribution of the pressure exerted from the upper belt 20 to the lower belt 10. On the other hand, a guidance of the belts in the form of a curve substantially avoids the formation of waves therein. Stiff belts, especially steel belts which are preferably used because of their long life, tend to warp, wave or ripple when they are subjected to non-uniform heating or load. This phenomenon is especially strong when attempting to guide the belts in a plane; this tendency is, however, substantially reduced when a belt is forced to follow a curved path. As warping, waving or rippling of the belts would make it difficult to ensure a uniform product thickness, the arcuate curved guidance of the belts is of importance.

A non-uniform heating or loading of the belts may also result in variations of their whole length or of the length of one edge. To compensate these variations of length it is preferred to provide a further compensation roller 13 for the belt 10; in the drawing this roller 13 is positioned at the inside of the belt 10 pressing against the lower run of the belt. Two hydraulic cylinders 42, 43 exert a predetermined force on the axis of said roller 13 so that the roller 13 is pressed against the belt 10 running past said roller As soon as the belt 10 has e.g. on one side a somewhat greater length than on the other, the compensation roller 13 is tilted accordingly, so that the belt remains always tightly stretched over its whole width and the variations in length have no effect on the operative zone of the belt 10.

In general it is sufficient when only one tension roller of the lower belt 10 is driven directly or indirectly. In the drawings, a driving motor 35 operates the tension roller 12 of the lower belt 10 via a suitable transmission 36. The corresponding tension roller 32 of the upper belt 20 can be driven synchronously by a direct power transmission (not shown). However, it is preferred not to drive the upper belt 20 constantly but to construct the power transmission in such a way that it can be interrupted after the machine has been started as soon as the material between the belts 10 and 20 provides sufficient adherence or friction to carry the freely running non-driven belt 20 along. Thereby an undesirable relative motion between the belts in the direction of motion is practically completely excluded.

The upper belt 20, which is preferably somewhat shorter than the lower belt 10, is also passed over two tension rollers 21 and 22. As already described above, the width of the slot between the lower belt 10 and the upper belt 20 at the feed end of the machine is determined by the distance between the tension roller 21 and the guide roller 15. To allow a variation of the width of the slot, the axis 27 of the tension roller 21 is journalled in an elongated guide slot 28. An alteration of the belt tension resulting from the adjustment of the axis roller 21 in the guide slot 28 is compensated by increasing or decreasing the pressure acting in outward direction on the axis of the tension roller 22.

In a similar manner as the lower belt 10, the upper belt 20 also is provided with a compensating roller 23 associated with corresponding hydraulic cylinders 44 and 45 acting on the ends of the axis. Like roller 13, this roller 23 serves primarily to compensate for variations in the length of the belt 20 during operation.

All guide slots for the axes of the various rollers as well as for the actuating means such as the hydraulic cylinders and the driving motor, are provided for the lower part 1 of the machine in a suitable frame, which is not shown in the drawing since the construction of a suitable frame will be obvious for those skilled in the art. The upper part 2 of the machine with the axes 27 and 29 of the tension rollers 21 and 22 can be supported in the same frame, thus being rigidly connected with the lower part 1. The belts 10 and 20 are spaced at the feed end by a predetermined distance corresponding to the adjusted width of the slot between the guide roller 15 and the tension roller 21. The belts 10 and 20 contact each other from the apex of the curvature of the upper run of the lower belt 10 forward of the guide roller 15 to the outlet end of the tension rollers 12 and 22 as long as no material is between the belts. The pressure of the upper belt 20 on the lower belt 10 is substantially dependent on the tension of the upper belt 20 as well as on the pressure exerted by the weight of the upper part 2 of the machine on the lower belt. This pressure, especially at the apex of the curvature forward of the guide roller 15, also affects the thickness of the product since the material not yet solidified is pressed outwardly by this pressure. The thickness of the final product is thus a function of the width of the slot between the guide roller 15 and the tension roller 21 and the pressure between the upper belt 20 and the lower belt 10.

When starting the machine it is desirable to drive also the upper belt in order to avoid any damage of the surface of the belts. However, as soon as the feed material is distributed between the belts over their entire contact length, the material provides sufficient adherence and friction for the upper belt to be carried along synchronously with the lower belt when only the lower belt is driven.

Especially when steel is used as belt material, the lateral guidance of the belts is a serious problem. Preferably the lateral guidance of the lower belt 10 is accomplished by mounting the axis 31 of the lower tension roller 12 pivotally. When the belt 10 drifts to one side, the pressure on the axis 31 is increased on this side, e.g. by suitable hydraulic cylinders (not shown), so that the belt is forced to return to its original position. This compensation function can be additionally effected by the compensation roller 13 which requires, however, the provision of a corresponding automatic control.

As already mentioned above, it is very important to avoid relative motion between the adjacent runs of the belts 10 and 20. This applies, of course, also to lateral movements of the belts so that it is generally necessary to take precautions that the upper belt 20 can readily follow the lateral movements of the belt 10. This may be achieved by coupling the compensation roller 23 of the upper belt 20 with the control of the lower belt, so that the upper belt carries out the same lateral movements. It is also possible to support the tension rollers 21 and 22 as well as the compensation roller 23 in a separate frame which is not rigidly connected with the frame of the lower part 1 but freely suspended or mounted in suitable guiding means for limited lateral movement. The frame of the upper part 2 may for instance be supported on rolls guided in tracks in the frame of the lower part 1. Hereby it is achieved that the whole upper part 2 directly follows all lateral movements of the lower belt 10 thus excluding detrimental relative motions between the belts.

If the zones of the belts enclosing the feed material must be heated, e.g. when thermosetting materials are processed which must be pre-hardened in this zone to form a product of sufficient dimensional stability, it is necessary to provide suitable heating means. The belts may be heated in this case e.g. by means of radiant electric heating devices, or an electric induction heating device, or by means of heated air, steam or hot water.

Since minor temperature variations may result in deformation or warping of the belts and thus in a product of non-uniform thickness, the uniform heating of the belts is of great importance. It has been found especially favourable to pass the belts through a heating chamber 30 (shown open in the drawing), where the belts 10 and 20 are sprayed from above and below with hot water from suitable nozzles (not shown). The temperature of the hot water can be accurately controlled in a simple manner and the good heat transfer from the water to the belt material ensures a uniform heating. In order to accelerate the hardening of the feed material and therewith to increase the running speed of the machine or to reduce the necessary length of the belts it may be favourable to pre-heat one or both of the belts before adding the feed material. Such preheating can be accomplished in a similar way. Thus preheating means can, for example, be positioned before the tension roller 11 at the lower run of the belt 10.

The whole device is preferably mounted in an inclined or tilted position as shown in the drawing so that the feed end is higher than the outlet. This construction has been found especially favourable with respect to a uniform distribution of the feed material and needs less space than if the adjacent runs of the belts extended horizontally.

The described apparatus may be modified in various ways. Thus the various hydraulic cylinders, especially the cylinders 42, 43, 44, 45 of the compensation rollers 13 and 23 may be replaced by suitable spring elements. As mentioned above, the preferred belt material is steel; however, belts of elastic or non-elastic plastics material may also be used. Moreover, the belts may also have a profiled surface instead of a smooth one so that correspondingly embossed sheets are obtained.

The described apparatus can also be used to prepare sheets which are reinforced by woven or non-woven fabrics. The reinforcing sheet is fed in a width corresponding to the width of the belts to the feed end of the machine where the fluid mass is simultaneously supplied so that a sheet end product is obtained in which the reinforcing sheet is completely enclosed by the hardened material.

A special advantage of the described apparatus is that the feed material is practically tightly enclosed by the two impervious belts so that volatile components contained in the material cannot escape. A special valuable application of the device is therefore the continuous production of porous sheets which are obtained by solidifying a solvent-containing synthetic resin composition and evaporating the finely dispersed solvent then from the solidified mass. For this application, it is—inter alia—of special value that the pressure between the belts can be exactly controlled.

What is claimed is:

1. Apparatus for the continuous production of sheets of substantially uniform thickness from flowable material, such apparatus comprising two endless superposed synchronously movable belts, at least two rollers for each belt, each belt passing over and being tensioned by its associated rollers whereby the flowable material is formable into a sheet between the adjacent superposed runs of the two belts, said apparatus having a feed end at the upstream end of the superposed runs of the two belts and including a further roller positioned at the feed end of the apparatus adjacent a first one of said tension rollers of the upper belt, the upper run of the lower belt passing in an upwardly directed curve from a first one of said tension rollers of the lower belt over said further roller and the space between said further roller and the first tension roller of the upper belt being such as to distribute the feed material widthwise of said belts during use of the apparatus.

2. Apparatus according to claim 1, including drive means for driving one of said belts, the other of said belts in use of the apparatus being non-driven and operatively carried along with said driven belt.

3. Apparatus according to claim 2, wherein said non-driven belt is mounted for limited movement in the direction of the axis of its supporting tension rollers in correspondence with lateral movements of the driven belt.

4. Apparatus according to claim 1, including a support axis carrying said first tension roller of the upper belt, and a supporting arm having an elongated guide slot formed therein, said axis being slidably mounted in said elongated guide slot to allow variation of the distance of said first upper tension roller from said further roller to control the width of the distribution space.

5. Apparatus according to claim 1, including means for adjustably mounting said further roller for varying the curvature of the lower belt and regulating the distance of the further roller from said first tension roller of the upper belt.

6. Apparatus according to claim 5, wherein the adjustable mounting means for said further roller comprises a swinging arm pivotally mounting said further roller.

7. Apparatus according to claim 1, including further guide roller means for supporting the upper run of the lower belt to pass in an outwardly bowed curved path.

8. Apparatus according to claim 1, including means defining an arcuate slot guiding the axis of the first tension roller of the lower belt for upward or downward movement.

References Cited
UNITED STATES PATENTS

| | | | |
|---|---|---|---|
| 2,460,566 | 2/1949 | Brown et al. | 18—19 M X |
| 2,867,843 | 1/1959 | Browne et al. | 18—4 B X |
| 2,975,470 | 3/1961 | Snelson et al. | 18—4 B |
| 3,241,182 | 3/1966 | Kessler | 18—4 M X |
| 3,258,812 | 7/1966 | Willy | 18—4 B |
| 3,408,690 | 11/1968 | Jacob | 18—4 B |
| 3,475,522 | 10/1969 | Garibian et al. | 18—4 B X |

FOREIGN PATENTS

| | | | |
|---|---|---|---|
| 1,125,852 | 2/1959 | Germany | 18—4 B |

J. SPENCER OVERHOLSER, Primary Examiner

R. L. SPICER, JR., Assistant Examiner

U.S. Cl. X.R.

18—19 R, 5 A